(12) United States Patent
Koraichi et al.

(10) Patent No.: US 8,700,848 B2
(45) Date of Patent: Apr. 15, 2014

(54) DATA EXCHANGE BETWEEN PROTECTED MEMORY CARDS

(75) Inventors: Najib Koraichi, Schimmert (NL); Sebastiaan Hoeksel, Maastricht (NL)

(73) Assignee: Vodafone Holding GmbH, Dusseldorf (DE)

( * ) Notice: Subject to any disclaimer, the term of this patent is extended or adjusted under 35 U.S.C. 154(b) by 310 days.

(21) Appl. No.: 12/577,288

(22) Filed: Oct. 12, 2009

(65) Prior Publication Data
US 2010/0095062 A1   Apr. 15, 2010

(30) Foreign Application Priority Data
Oct. 13, 2008  (EP) .................................. 08017897

(51) Int. Cl.
*G06F 12/00*   (2006.01)

(52) U.S. Cl.
USPC ................... 711/115; 711/E12.001; 235/380; 713/189

(58) Field of Classification Search
USPC ............ 711/115, E12.001; 235/380; 713/189
See application file for complete search history.

(56) References Cited

U.S. PATENT DOCUMENTS

| | | | |
|---|---|---|---|
| 7,043,642 B1* | 5/2006 | Lisimaque | 713/189 |
| 2005/0195975 A1* | 9/2005 | Kawakita | 380/30 |
| 2008/0067240 A1* | 3/2008 | Nakano et al. | 235/380 |
| 2010/0029200 A1* | 2/2010 | Varriale et al. | 455/41.1 |
| 2011/0131640 A1* | 6/2011 | Canis Robles et al. | 726/7 |

* cited by examiner

*Primary Examiner* — Mardochee Chery
(74) *Attorney, Agent, or Firm* — International IP Law Group, PLLC

(57) ABSTRACT

There is provided a method for transferring data from a first memory card to a second memory card, each memory card allowing reading and/or writing access upon verification of an allocated credential. An exemplary method comprises providing the credentials allocated to the memory cards to a managing device. The exemplary method also comprises receiving in the managing device data from the first memory card and providing to the second memory card the credential allocated to the second memory card by the managing device. The exemplary method additionally comprises forwarding the data from the managing device to the second memory card and storing the data in the second memory card after having successfully verified said credential in the second memory card.

14 Claims, 2 Drawing Sheets

DATA EXCHANGE BETWEEN PROTECTED MEMORY CARDS

CROSS REFERENCE TO RELATED APPLICATION

This application claims priority to European (EP) Patent Application No. 2008017897.3, filed on Oct. 13, 2008, the contents of which are incorporated by reference as if set forth in their entirety herein.

BACKGROUND

Memory cards are integrated circuit (IC) cards including non-volatile memory and a controller, which controls the operation of the memory card. Such memory cards are used with personal computers (PCs), cellular telephones, personal digital assistants (PDAs), digital cameras, portable audio players and other host electronic devices for storage of data. A plurality of standards exists that specify different types of memory cards, such as, for example, SD (Secure Digital) cards, CF (Compact Flash) cards and MMCs (Multimedia Cards). A further example of a memory card, in the sense the term is used herein, is a USB (universal serial bus) flash memory device.

Memory cards of the type described before may provide a security mechanism for protecting data from unauthorized access. The card owner may access the data using a credential, such as, for example, a password. This allows for storing sensitive data in the memory card, such as, for example, banking details of the card owner, medical data of the card owner and personal photographs or other personal data.

Often users own multiple protected memory cards, and they may wish to transfer data from one of memory card to another one of his memory card.

SUMMARY OF THE INVENTION

Exemplary embodiments of the present invention may relate to memory cards with access protection. More specifically, an exemplary embodiment of the present invention may relate to a method, a device and a system for transferring data from a first memory card to a second memory card.

An exemplary embodiment of the present invention may allow for transferring data from one protected memory card of a user to another protected memory card of the user.

In an exemplary embodiment of the present invention, a method for transferring data from a first memory card to a second memory card is suggested. Each memory card allows reading and/or writing access upon verification of an allocated credential. The method comprises the following steps:
 providing the credentials allocated to the memory cards to a managing device;
 receiving in the managing device data from the first memory card;
 providing to the second memory card the credential allocated to the second memory card by the managing device,
 forwarding the data from the managing device to the second memory card and storing the data in the second memory card after having successfully verified said credential in the second memory card.

An exemplary embodiment of the invention provides a device for transferring data from a first memory card to a second memory card. The exemplary system comprises at least two memory cards, each memory card allowing reading and/or writing access upon verification of an allocated credential. In the exemplary system, the memory cards can be coupled to a managing device storing the credentials allocated to the memory cards. The managing device may be adapted to receive data from the first memory card and to forward the data to the second memory card. The managing device may be further adapted to provide to the second memory card the credential allocated to the second memory card.

According to an exemplary embodiment of the invention, an exemplary system for transferring data from a first memory card to a second memory card is provided. The exemplary system comprises the device and a first memory card and a second memory card. The second memory card may be adapted to store the data in the second memory card after having successfully verified the credential provided by the managing device.

Exemplary embodiments of the present invention may store credentials, which are necessary to read data from a memory card and/or write data to a memory card, in a managing device. The managing device may be used for transferring data from one protected memory card to another. This allows the owner of the memory cards to copy or move data from one memory card to another in an easy and convenient way.

In one exemplary embodiment of the method, the device and the system, the managing device identifies the second memory card using an identification feature read out from the second memory card in order to be able to determine the credential allocated to the second memory card.

The identification feature, which may be an identification code, for example, may be stored in the memory card in unprotected form. In particular, it may be accessible without having to provide the allocated credential to the memory card.

In an exemplary embodiment of the method, the device and the system, the credential allocated to the second memory card may be determined using an allocation between the identification code and the credential stored in the managing device.

In one exemplary embodiment of the method, the device and the system, a card reader unit coupled to the managing device receives the first memory card, when the data is transmitted form the first memory card to the managing device. The card reader unit receives the second memory card, when the data is forwarded from the managing device to the second memory card.

In an exemplary embodiment, the data can be transferred from one protected memory card to another using only one card reader unit. In particular, this allows the use of a device for transferring the data, which comprises the managing device and one card reader unit for receiving the memory cards.

In an exemplary embodiment of the invention, the first memory card is replaced by the second memory card after the data to be transferred have been received in the managing device. The managing device may temporarily store the data to be transferred, while the first memory card is replaced by the second memory card.

In an alternative exemplary embodiment of the method, the device and the system, the memory cards are connected to the managing device simultaneously.

In such an exemplary embodiment, an interface allows for connecting the memory cards to the managing device simultaneously. The memory cards thus do not have to be replaced during the process of transferring data from one card to another.

One exemplary embodiment of the method, the device and the system comprises that the managing device and at least one interface for connecting one memory card to the managing device is included in one device.

In an exemplary embodiment of the present invention, the integration of the managing device and at least one interface into one device leads to a reduction of the number of devices that may be needed for transferring the data.

In one exemplary embodiment of the method, the device and the system, at least one interface for connecting to a memory card is included in a host device, the host device being connected to the managing device via a data link.

A memory card can be connected to the managing device via a host device, if the managing device does not dispose of its own interface for connecting a memory card. The data link between the managing device and the host device may comprise a wired connection or a wireless connection.

Furthermore, in one exemplary embodiment of the method, the device and the system, the managing device may be contained in a mobile communication device comprising a SIM card, said SIM card storing the credentials allocated to the memory cards.

The term SIM card as used herein refers to a smartcard offering identification and/or authentication services to a mobile communication network. The smartcard may comprise a SIM (Subscriber Identity Module) application according to the GSM (Global System for Mobile Communications) standard, a USIM (Universal Subscriber Identity Module) according to the UMTS (Universal System for Mobile Telecommunications) standard or corresponding applications providing authentication and/or identification functions in connection with a mobile communication network.

When using such a SIM card for storing the credentials, existing security mechanisms of the SIM card may be used, which also allows for a secure storage of the credentials.

In addition to the advantage that the SIM card of the mobile communication device can be used to securely store the credentials, the managing device may be included in a device that the data owner often already carries along in many situations.

In an exemplary embodiment, the data to be transferred to the second memory card may only be read from the first memory card, after the first memory card has successfully verified the credential allocated to this card. Therefore, in an exemplary embodiment of the method, the device and the system, the credential allocated to the first memory card may be provided to the first memory card by the managing device, and the data may be transmitted from the first memory card to the managing device after having successfully verified said credential in the first memory card.

The managing device may also identify the first memory card using an identification feature read out from the first memory card in order to be able to determine the credential allocated to the first memory card.

In order to prevent an unauthorised person from using the managing device, one exemplary embodiment of the method, the device and the system comprises that a credential can only be provided to the first and/or the second memory card only after a user of the managing device has been authenticated successfully in an authentication unit coupled to the managing device.

In an exemplary embodiment, unauthorised users are prevented from accessing the data securely stored in the memory cards by using the managing device.

The authentication unit may be included in the SIM card connected to the managing device, since the SIM card already provides a reliable mechanism for authenticating a user. The SIM card may unlock the function of the managing device for providing a credential to a memory card, after having successfully authenticated the user.

BRIEF DESCRIPTION OF THE DRAWINGS

Reference will be made by way of example to the accompanying drawings in which.

DETAILED DESCRIPTION OF SPECIFIC EMBODIMENTS

Figure 1:
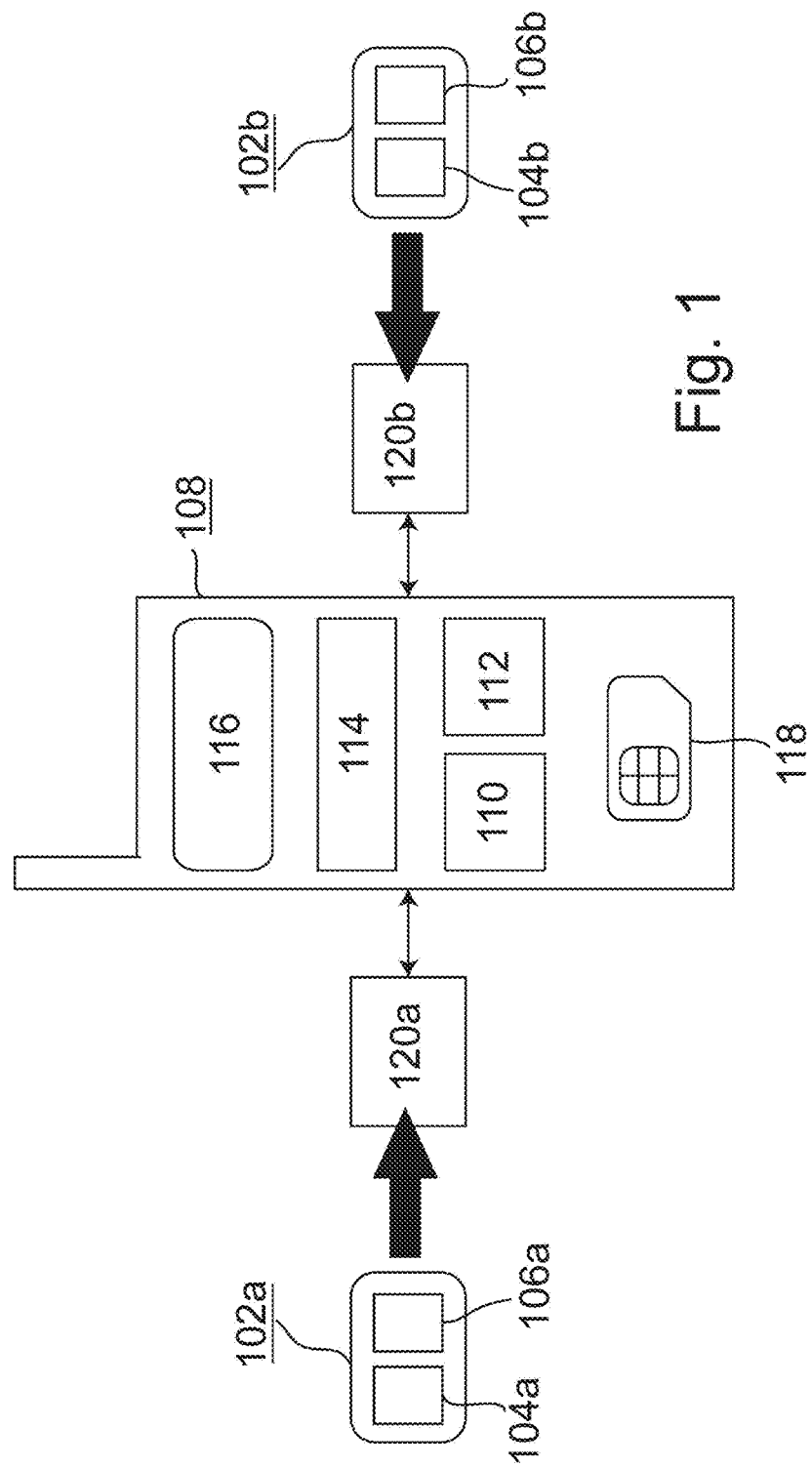
FIG. 1 is a block diagram of a system for exchanging data between multiple memory cards according to a first exemplary embodiment of the present invention.

FIG. 1 schematically depicts a system, in which data can be exchanged between multiple memory cards $102a,b$. In FIG. 1 two memory cards $102a,b$ are shown by way of example. However, the system may comprise more than two memory cards $102a,b$. The memory cards $102a,b$ can store any kind of data, such as, for example, music files, digital photos, videos or other documents of the user.

Each memory card $102a,b$ comprises a memory $104a,b$ and a microcontroller $106a,b$ integrated into a housing. The housing may be small enough so that the owner can carry the memory card $102a,b$ easily and that the memory card $102a,b$ can be used in connection with card readers, which are integrated into small devices, such as, mobile communication devices. The memory card $102a,b$ may be configured according to a standard format, and may be an SD card, a CF card, a MMC or the like. Another example of a memory card format in the sense of this disclosure is a USB flash memory device. The standard format may particularly specify the size and shape of the memory card $102a,b$, the configuration of its electric contacts and/or the communication protocols used in the communication with the memory card $102a,b$. The standard compliance of the memory card $102a,b$ allows the card to be accessed using card reader devices, which are likewise compliant with the standard.

It should be noted that the memory cards $102a,b$ that can exchange data among each other do not need to be the same types of cards. Rather, in the system a data exchange between memory cards $102a,b$ of different types is also possible.

The memory $104a,b$ is a non-volatile storage that can be electrically erased and reprogrammed. Particularly, the memory $104a,b$ may be configured as a solid state storage unit, particularly as flash memory or as non-flash EEPROM (Electrically Erasable Programmable Read-Only Memory). However, the person skilled in the art understands that in principle any sort of memory device may be used. The memory $104a,b$ may be constituted by one or more memory chips, which are arranged in the housing of the memory card $102a,b$.

The microcontroller $106a,b$ and the memory $104a,b$ may reside on one single chip within the memory card $102a,b$ or the microcontroller $106a,b$ may be a separate chip connected to the memory $104a,b$. The microcontroller $106$ provides functionality for accessing the memory $104a,b$ using devices to which the memory card $102a,b$ is connected. In particular, the microcontroller $106a,b$ implements the communication protocols used for the data exchange between the memory card $102a,b$ and a connected device.

The memory $104a,b$ of the memory cards $102a,b$ is protected against unauthorized access, i.e. the unauthorized reading, writing and manipulating of the data stored in the memory cards 102a,b. This allows the user to store personal and/or sensitive data in the memory cards 102a,b which are only provided for personal use or for sharing with selected other persons. For protecting the memory 104a,b of a memory card 102a,b, the microcontroller 106a,b of that card may provide a security logic controlling access to the memory 104a,b. The security logic of the microcontroller 106a,b permits accessing the memory 104a,b only after a credential has been provided and successfully verified. The credential may be a code, such as a password or a PIN (Personal Identification Number), or a digital signature, for example.

The system depicted in FIG. 1 comprises one managing device 108. In one exemplary embodiment, the managing device 108 is a mobile communication device, such as, for example, a cellular phone, a PDA (personal data assistant) or the like. The managing device 108 comprises a microprocessor 110 controlling the operation of the managing device 108. The microprocessor 110 is coupled to a memory unit 112 that stores software programs that can be run on the microprocessor 110 and data used in the operation of the managing device 108. A user may operate the managing device 108 using an input unit 114, such as, for example, a keypad, and a display unit 116, such as, for example, a monitor. The input unit 114 and the display unit are also coupled to the microprocessor 110.

Furthermore, the managing device 108 may comprise a radio module, which is not shown in FIG. 1, the radio module allowing connecting the managing device 108 to a mobile communication network via a radio access network. For instance, the mobile communication network may a GSM (global system for mobile telecommunications) or a UMTS (universal mobile telecommunications system) network.

A further component of the system is a smartcard 118, which is inserted into the managing device 108. For receiving the smart card 118, the managing device 108 may comprise a card reader that is not depicted in FIG. 1. The smartcard 118 comprises a microcontroller providing a secure environment for the execution of applications and the storage of data. Particularly, this means that unauthorized access to data and processes is prevented due to the hardware design of the microcontroller and due to cryptographic mechanisms used for managing data in the microcontroller. Moreover, the smartcard 118 is physically protected against manipulations, such as, power analysis, reverse engineering etc.

Accessing the functions of the smartcard 118 and data stored therein requires that the smartcard 118 authenticates the user of the host device 108.

The user authentication is performed using a secret credential allocated to the user, which is entered at the managing device 108 and passed to the smartcard 118. In the smartcard 118, the credential is checked by a security mechanism, which unlocks the functions and data after having successfully verified the credential. Furthermore, it may be provided that all or some of the functions of the managing device 108 are protected and have to be unlocked by the smartcard 118. The smartcard 118 may unlock these functions after having successfully verified the credential.

The smartcard 118 may be used in conjunction with a utilization of the managing device 108 in the mobile communication network. In particular, the smartcard 118 may comprises an application, which provides identification and authenticating services to the mobile communication network. If the mobile communication network is a GSM network, the smartcard 118 is configured as a SIM (subscriber identity module) card according to the GSM standard comprising a SIM application, which provides the identification and authentication service. If the mobile communication network is a UMTS network, the smartcard 118 is configured as a UICC (universal integrated circuit card) comprising a USIM (universal subscriber identification module) application providing the identification and authentication service.

In the following the smartcard 118 is referred to as SIM card. However, the term SIM card, as used herein, is to be understood as including also smartcards 118 comprising USIM applications or corresponding applications providing authentication and/or identification functions in connection with a mobile communication network.

For exchanging data between the memory cards 102a,b, the memory cards 102a,b are being connected to the SIM card 118. For this purpose, the memory cards 102a,b may be inserted into card reader units 120a,b, which are suitable to receive memory cards 102a,b of the respective card format. The card reader units 120a,b are connected to an interface of the managing device 108 via data links. The data links may be wired links or wireless links. Examples of wireless links are radio connections, such as, for example, Bluetooth connections, or infrared connections. The interface of the managing device 108 connects the card reader units 120a,b to the SIM card 118.

In further exemplary embodiments, which are not depicted in FIG. 1, the managing device 108 may comprise one or more card reader units 120a,b for receiving memory cards 102a,b. In this case, one or more memory cards 102a,b can be inserted into the card reader units 120a,b available in the managing device 108 and can be connected with the SIM card 118 via these card reader units 120a,b.

As a further alternative, at least one memory card 102a,b may comprise a radio interface so that the memory card 120a,b can be connected to a radio interface of the managing device 108, which connects the memory card 102a,b to the SIM card 118 inserted into the managing device 108. Here, a card reader unit 120a,b for receiving the memory card 102a,b can be dispensed with. If the SIM card 118 likewise provides a radio interface, a radio enabled memory card 102a,b may also be connected directly with the SIM card 118 via a radio link. The radio link between the memory card 102a,b and the managing device 108 may be a short range radio link, such as, for example, an NFC (Near Field Communication) or a ZigBee link.

The credentials, which are necessary for accessing the memory 104a,b of the memory cards 102a,b are securely stored in the SIM card 118. They are passed to the SIM card 118 using an application of the SIM card 118 or an application of managing device 108, which communicates with the SIM card 118. The application allows to enter the credentials and to store them in the SIM card 118 after the credential assigned to the SIM card 118 has been successfully verified. The user interacts with the application using the input unit 114 and the display unit 116 of the managing device 108. The application may provide a graphical user interface, which is presented at the display unit 116 and the application may be controlled by the user utilising the input unit 114. In particular, the input unit 114 may be used to enter the credentials. After having stored the credentials allocated to the memory cards 102a,b in the SIM card 118, the security mechanism of the SIM card 118 described before protects the credentials from being accessed by unauthorized third parties.

The credentials stored in the SIM card 118 are used for exchanging data between the memory cards 102a,b utilizing the managing device 108. In particular, this means that the managing device 108 can be used for copying or moving data from one memory card 102a,b to the other memory card 102a,b. Furthermore, the storage of the credentials may be combined with a management of the memory cards 102a,b available.

Particularly, this means that the memory cards 102a,b available are identified in a file or database of the SIM card 118. For this purpose, unique identification codes, which are allocated to the memory cards 102a,b, may be entered in the file or database. The identification codes may be stored in the memory cards 102a,b at the time of manufacture, or they may be stored therein later on by the user. They may be stored in the memory cards 102a,b without protection so that they can be read without providing the credential to the memory card 102a,b, which is necessary to access the protected files. In addition, a name and/or a description of the memory cards 102a,b may be stored in the SIM card 118. This information may be entered by the user to allow him to identify a memory card 102a,b easily. For instance, the user may enter a description indicating the information stored in the memory card 102a,b.

The file or database of the SIM card 118 stores the identification codes and allocation between the identification codes and the credentials allocated to the memory card 102a,b. Each time a memory card 102a,b is accessed, the identification code of the memory card 102a,b is read from the memory card 102a,b. Then, the credential allocated to the identification code is determined and transmitted to the memory card 102a,b. The microcontroller 106a,b of the memory card 102a,b checks the validity of the credential and allows access to the data stored in the memory 104a,b of the memory card 102a,b, if the credential has been verified successfully.

The functionality of the managing device 108 for copying or moving data stored in one memory card 102a,b to another memory card 102a,b is provided via a software application, which may be executed by the microprocessor 110 and which communicates with the SIM card 118. In another exemplary embodiment, the application is executed in the SIM card 118. For allowing the user to control the data exchange, the application may provide a graphical user interface which is presented on the display unit 116 of the managing device 108. Commands for controlling the application may be input by the user utilising the input unit 114 of the managing device 108.

The application may be started by the user after he has input the credential for accessing the SIM card 118. As described before, in one exemplary embodiment, the functions of the managing device 108 can only be accessed after the managing device 108 has been unlocked by the SIM card 118, where the unlocking of the functions of managing device 108 requires the successful verification of the credential in the SIM card 118. This mechanism, which is particularly provided in managing devices 108 that are configured as mobile communication devices, already ensures that the application for controlling the data exchange between the memory cards 102a,b cannot be started without the user authentication in the SIM card 118.

After having started the application the user selects one memory card 102a,b as the source for a data transfer, i.e. the user selects the memory card 102a,b storing the data that the user wants to transfer to another memory card 102a,b.

The selection can be made among the memory cards 102a,b, which are registered in the SIM card 118, i.e. those memory cards 102a,b to which a credential is allocated that is stored in the SIM card 118. The registered memory cards 102a,b may be identified in a list presented at the display unit 116 of the managing device 108 and the user may select one memory card 102a,b from the list using the input unit of the managing device 108. In the list, the names allocated to the memory cards 102a,b and stored in the SIM card 118 and/or the description of the memory cards 102a,b may be given.

Since not all of the registered memory cards 102a,b may be connected to the managing device 108, the application may determine, which registered memory cards 102a,b are connected to the managing device 108 and presents only those memory cards 102a,b, which are connected to managing device 108, in the list. Thus, it is ensured that the user can only select the source memory cards 102a,b among those registered memory cards 102a,b, which are connected to the managing device 108.

In the following example, it is assumed that the memory card 102a is the data source and that the memory card 102b is the target of the data transfer.

After the user has selected the memory cards 102a as the source for the data transfer, the user may select the files, which are to be transferred to another memory card 102b. For this purpose, the application may access the source memory card 102a and read the file names of the files stored therein. Accessing the memory card 102a requires that the credential allocated to the memory card 102a is transmitted from the SIM card 118 to the memory card 102a and that the microcontroller 106a of the memory card 102a verifies the credential. After having verified the credential successfully, the microcontroller 106a of the source memory card 102a allows the application to access the memory 104a of the memory card 102a and read the file names. The read files names may be presented to the user at the display unit 116 of the managing device 108 and the user may select the files using the input unit 114 of the managing device 108.

In a further step, the user selects the memory card 102b as the target for the data transfer. This means that the user selects the memory card 102b to which the files are to be transferred. For selecting the target memory card 102b, the memory cards 102a,b, which are registered in the SIM card 118 and which are connected to the managing device 108 may be again presented to the user at the display unit 116 of the managing device 108. In one exemplary embodiment, the source memory card 102a may not be made selectable as the target memory card 102b.

The selection of the target memory card 102b may be made using a so called drag and drop mechanism, where the user drags symbols representing the files to be transferred to a symbol representing the target memory card 102b in the graphical user interface provided by the application. However the selection of the target memory card 102b may also be made in another way.

Furthermore, the user may be given opportunity to decide whether the selected files shall be copied or moved to the target memory card 102b, such as whether the files to be transferred shall be deleted in the source memory card 102a or whether they shall remain stored in the source memory card 102a.

After the user has selected the target memory card 102b the application retrieves the files selected for the data transfer from the source memory card 102a,b and forwards the files to the target memory card 102b. In the target memory card 102b, the files are then stored in the memory 104b. For accessing the target memory card 102b the application transmits the credential allocated to that memory card 102b, which is stored in the SIM card 118, to the target memory card 102a. The microcontroller 106b of the target memory card 102b checks the credential and after having successfully verified the credential, it allows writing the files to the memory 104b of the target memory card 102b. Furthermore, if the user has decided, that the files shall not be copied but moved to the target memory cards 102b, the application deletes the files in the source memory card 102a or controls the microcontroller 106a of the memory card 102a to delete the files.

Figure 2:
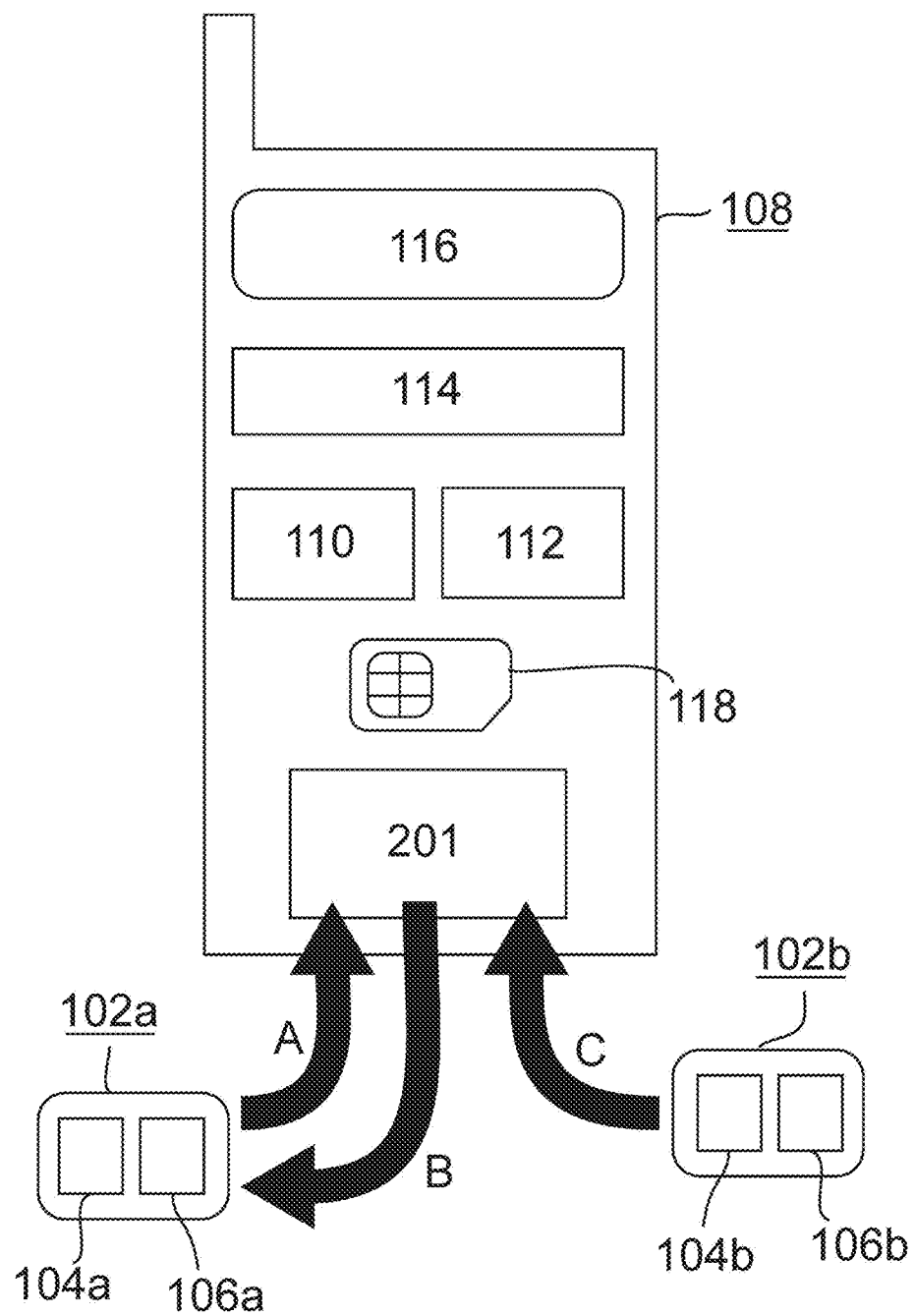
FIG. 2 is a block diagram of a system for exchanging data between multiple memory cards according to an alternative exemplary embodiment of the present invention.

Another exemplary embodiment of a system for exchanging data between memory cards 102a,b is depicted in FIG. 2. In this exemplary embodiment, the managing device 108 comprises one card reader unit 201 for accepting the memory cards 102a,b. The memory cards 102a,b, which are used in this exemplary embodiment of the system, should be of the same type so that they can be received in the card reader unit 201. If memory cards 102a,b of different types are used, suitable adapters may be provided to make those memory cards 102a,b compatible to the card reader unit 201, which do not have a compatible format.

The exemplary embodiment depicted in FIG. 2 differs from the exemplary embodiment described before in connection with FIG. 1 in that not all memory cards 102a,b are connected to the managing device 108 at the same time. Rather, the source memory card 102a is inserted into the card reader unit 201 at first and than the source memory card 102a is replaced by the target memory card 102b. While replacing the source memory card 102a with the target memory card 102b, the files to be transferred, which have been read from the source memory card 102a are temporarily stored in the managing device 108 before the written to the target memory card 102b.

In the exemplary embodiment depicted in FIG. 2, the application for controlling data exchange may again be started by the user as in the exemplary embodiment described before after he has input the credential for accessing the SIM card 118. For selecting the files of the source memory card 102a, which are to be transferred to the target memory card 102b, the user inserts the source memory card 102a into the card reader unit 201 of the managing device 108. In FIG. 2, this is schematically depicted by the arrow A.

After the memory card 102a has been inserted into the card reader unit 201, the application may identify the source memory card 102a,b by reading the identification code of the memory card 102a,b and that the allocated name and/or description of the memory card 102a,b is presented in the graphical user interface provided by the application.

After the user has inserted the source memory card 102a into the card reader unit 201, the application may access the source memory card 102a and read the file names of the files stored therein. This requires that the credential allocated to the memory card 102a is transmitted from the SIM card 118 to the memory card 102a and that the microcontroller 106a of the memory card 102a verifies the credential. After having verified the credential successfully, the microcontroller 106a of the source memory card 102a allows the application to access the memory 104a,b of the memory card 102a,b and read the file names. The read file names may be presented again to the user at the display unit 116 of the managing device 108 and the user may select the files using the input unit 114 of the managing device 108. In addition to selecting the files for the data transfer, the user may also decide, whether the files shall be copied or moved to the target memory card 102b.

Then, the application reads the selected files from the source memory card 102a and stores the files in the memory unit 112 of the managing device 108 or it stores the files in the SIM card 118. The latter has the advantage that the files are protected by the security architecture of the SIM card 118, when they are stored in the managing device 108. If the user has decided that the files shall not be copied but moved, the application also deletes the files from the memory card 102a,b or controls the microcontroller 106a,b of the memory card 102a,b to delete the files.

After the files have been stored in the managing device 108, the user is requested to remove the source memory card 102a,b from the card reader unit 201 and to insert the target memory card 102a,b. Upon this request the user removes the source memory card 102a from the card reader unit 201, what is depicted in FIG. 2 by arrow B, and inserts the target memory card 102b into the card reader unit 201, what is schematically depicted by arrow C.

When the target memory card 102b is inserted into the card reader unit 201, the user may confirm the transfer of the data to target memory card 102b. Here, it may be again provided that the application identifies the target memory card 102b by reading the identification code of the memory card 102b and that the allocated name and/or description of the memory card 102b is presented in the graphical user interface provided by the application before the user confirm the data transfer.

After the confirmation of the user, the application transmits the files, which are stored in the managing device 108, to the target memory card 102b and stores the files in the memory 104a of the target memory card 102b. For accessing the target memory card 102b the application transmits the credential allocated to that memory card 102b, which is stored in the SIM card 118, to target memory card 102b at first. The microcontroller 106b of the target memory card 102b checks the credential and after having successfully verified the credential, it allows writing the files to the memory 104b of the target memory card 102b. After the files have been stored in the target memory card 102b, they may be deleted in the managing device 108. Thus, the managing device 108 stores the files only temporarily, while the user replaces the source memory card 102a with the target memory card 102b.

While exemplary embodiments of the invention have been illustrated and described in detail in the drawings and foregoing description, such illustration and description are to be considered illustrative or exemplary and not restrictive; the invention is not limited to the disclosed exemplary embodiments. Other variations to the disclosed exemplary embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage.

Any reference signs in the claims should not be construed as limiting the scope.

What is claimed is:

1. A method for transferring data from a first memory card to a second memory card via a managing device comprising a SIM card, each memory card comprising a memory for data, a microcontroller and a unique identification code allocated to the memory card, and allowing reading and/or writing access upon verification of an allocated credential, comprising the steps of:

allowing to enter the credentials allocated to the memory cards to the managing device via an application by a user interacting with the application after the credentials assigned to the SIM card has being successfully verified and passing the credentials allocated to the memory cards to the SIM card, where the credentials allocated to the memory cards are stored and protected from being accessed by unauthorized third parties;

entering the identification codes of the memory cards by the user and storing the identification codes of the memory cards in the SIM card, where the credentials are allocated to the identification code of the memory cards;

connecting the memory cards to the SIM card via an interface of the managing device;

reading the identification code from the memory card and transmitting the credential allocated to the identification code from the SIM card to the memory card by the application in order to allow access to the data stored in a memory of the memory card after the credential has been successfully verified by the microcontroller of the memory card; and selecting one memory card as a source for the data transfer and the other memory card as a target for the data transfer via a display of the managing device by the user.

2. The method according to claim 1, comprising:

receiving the first memory card in a card reader unit coupled to the managing device, when the data is transmitted from the first memory card to the managing device; and receiving the second memory card in the card reader unit, when the data is forwarded from the managing device to the second memory card.

3. The method according to claim 1, wherein the managing device temporarily stores the data to be transferred, while the first memory card is replaced by the second memory card.

4. The method according to claim 1, comprising simultaneously connecting the memory cards to the managing device.

5. The method according to claim 1, wherein a single device comprises the managing device and at least one interface that is adapted to connect one memory card to the managing device.

6. The method according to claim 1, wherein a host device comprises at least one interface that is adapted to connect the managing device to a memory card, the host device being connected to the managing device via a data link.

7. The method according to claim 1, comprising storing the credentials allocated to the memory cards in a SIM card of a mobile communication device that contains the managing device.

8. The method according to claim 1, comprising:

providing the credential allocated to the first memory card to the first memory card by the managing device; and transmitting the data from the first memory card to the managing unit after having successfully verified the credential in the first memory card.

9. The method according to claim 1, wherein a credential can be provided to the first and/or the second memory card only after a user of the managing unit has been authenticated successfully in an authentication unit coupled to the managing device.

10. A managing device for transferring data from a first memory card to a second memory card, each memory card comprising a memory for data, a microcontroller, an unique identification code allocated to the memory card to identify the memory card and allowing reading and/or writing access upon verification of a credential, the managing device comprising:

a SIM card for securely storing the credentials necessary for accessing the memory cards, for storing the identification codes of the memory cards entered by the user and for allocating the credentials to the identification code of the memory cards;

an interface of the managing device to connect the memory cards to the SIM card;

an application allowing to enter the credentials allocated to the memory cards by a user interacting with the application after the credentials assigned to the SIM card has being successfully verified and passing them to the SIM card, where the credentials allocated to the memory cards are stored and protected from being accessed by unauthorized third;

the application reading the identification code from the memory card and transmitting the credential allocated to the identification code from the SIM card to the memory card in order to allow access to the data stored in a memory of the memory card after the credential has been successfully verified by the microcontroller of the memory card; and a display to enable the user to select one memory card as a source for the data transfer and the other memory card as a target for the data transfer.

11. The managing device according to claim 10, comprising a card reader coupled to the managing device, the card reader being adapted to receive the first memory card when the data is transmitted from the first memory card to the managing device, and to receive the second memory card in the card reader, when the data is forwarded from the managing device to the second memory card.

12. The managing device according to claim 10, wherein the managing device is adapted to temporarily store the data to be transferred while the first memory card is replaced by the second memory card.

13. The device according to claim 10, wherein both memory cards are simultaneously connected to the managing device.

14. A system for transferring data from a first memory card to a second memory card, the system comprising:

a first memory card and a second memory card each memory card comprising a memory for data, a microcontroller, an unique identification code allocated to the memory card to identify the memory card and allowing reading and/or writing access upon verification of a credential;

a managing device for transferring data from the first memory card to the second memory card, a SIM card for securely storing the credentials necessary for accessing the memory cards and for storing the identification codes of the memory cards entered by the user;

an interface of the managing device to connect the memory cards to the SIM card;

an application allowing to enter the credentials allocated to the memory cards by a user interacting with the application after the credentials assigned to the SIM card has being successfully verified and passing them to the SIM card, where the credentials allocated to the memory cards are stored and protected from being accessed by unauthorized third parties;

the application reading the identification code from the memory card and transmitting the credential allocated to the identification code from the SIM card to the memory card in order to allow access to the data stored in a memory of the memory card after the credential has been successfully verified by the microcontroller of the memory card; and a display to enable the user to select one memory card as a source for the data transfer and the other memory card as a target for the data transfer.

* * * * *